United States Patent Office 3,481,653
Patented Dec. 2, 1969

3,481,653
BRAKE INSTALLATION
Michel Grancon, Marnes-la-Coquette, France, assignor to Automobiles Peugeot, Paris, France, a French body corporate and Regie Nationale des Usines Renault, Billancourt, France, a French body corporate
Filed Apr. 15, 1968, Ser. No. 721,463
Claims priority, application France, May 26, 1967, 108,072
Int. Cl. B60t 8/10
U.S. Cl. 303—21   2 Claims

ABSTRACT OF THE DISCLOSURE

A hydraulic brake installation comprising a master cylinder assisted by a vacuum servomotor controlling an emitting cylinder, an antilock device adapted to detect any wheel lock and immediately reduce the degree of assistance of the servomotor, and consequently the braking action, by temporarily modifying the balance of the pneumatic part of said servomotor, the prior state of said servomotor being automatically re-established at the end of the wheel lock.

---

The present invention relates to hydraulic brake installations for wheels of automobile vehicles or other machines, including aircraft.

It is known that when the feed device does not have continuous flow, the master cylinder alone actuated by the brake pedal could not be subjected to a sufficient succession of brake applications and releases without reaching the end of travel and becoming consequently inoperative. This can be remedied by combining in the form of a servo-brake the master cylinder hydraulic circuit with an auxiliary source of energy acting in opposition to the force of the driver and constituted usually by a vacuum servo-motor. Such a servo-brake is that of the well-known type sold by the company Bendix under the trade name "Hydrovac."

But, although the assembly of the brake having a hydrulic circuit, master cylinder and vacuum servo-motor does in fact permit, by ensuring an economy of liquid obtaining a substantially indefinite succession of brake applications and releases, it does not prevent the locking of one or several of the wheels of the vehicles or other machine in the course of an excessively energetic braking, taking into account the loading and ground adherence conditions.

The object of the invention is to remedy this serious drawback and prevent the locking of the wheels.

The invention provides an hydraulic brake installation comprising a master cylinder assisted by a vacuum motor controlling an emitting cylinder, an anti-lock device adapted to detect any wheel lock and immediately reduce the degree of assistance of the servo-motor, and consequently the braking action, by temporarily modifying the balance of the pneumatic part of said servo-motor, the prior state of said servo-motor being automatically-reestablished at the end of the wheel lock.

According to one embodiment, the servo-motor, being of the type comprising in a cylinder a piston defining two chambers one of which is under a vacuum and the other under a vacuum between the foregoing vacuum and zero, when said chamber is connected to the atmosphere, the anti-lock device comprises an electro-valve whose excitation circuit causing its opening is connected to a source of electricity through a contactor adapted to detect, upon its closure, any wheel lock, said electrovalve being adapted when it is excited to put under a vacuum said chamber of the pneumatic servo-motor which is normally under a lower vacuum when said servo-motor is operative.

The source of negative pressure or the reserve of vacuum must of course have a sufficient flow to ensure the braking once again as soon as this becomes possible. The source can be advantageously the induction manifold of the engine of the vehicle.

Further features and advantages of the invention will be apparent from the ensuing description with reference to the accompanying drawings.

Figure 1:
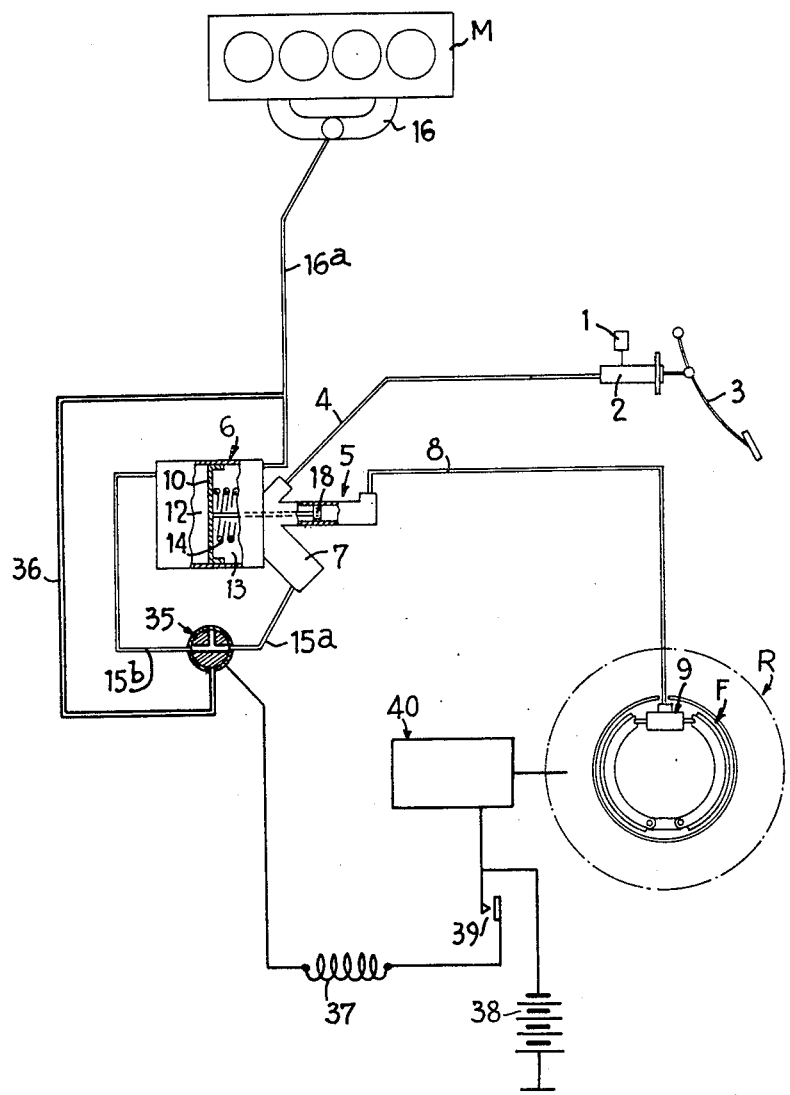
Figure 2:
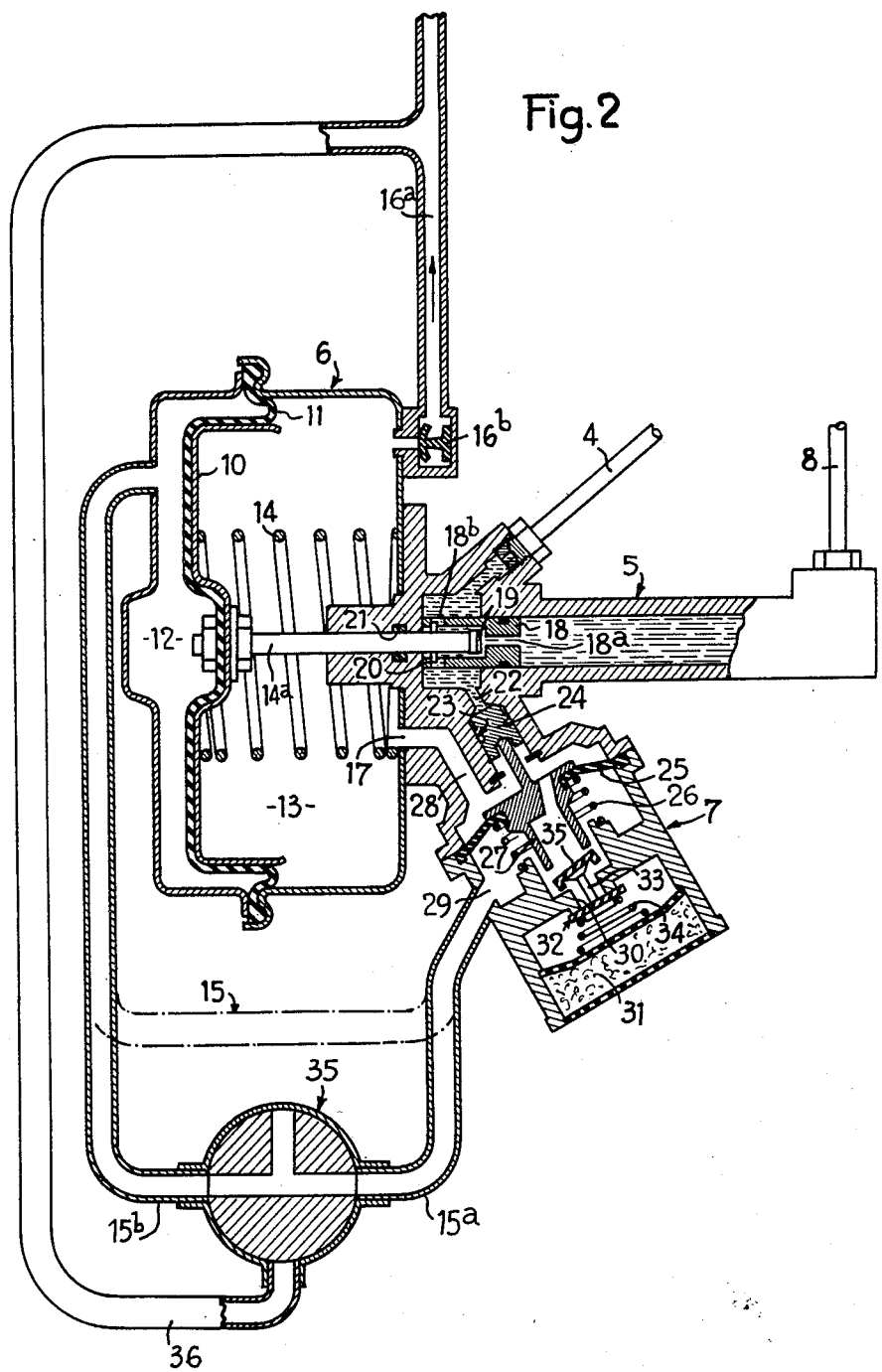
Figure 3:
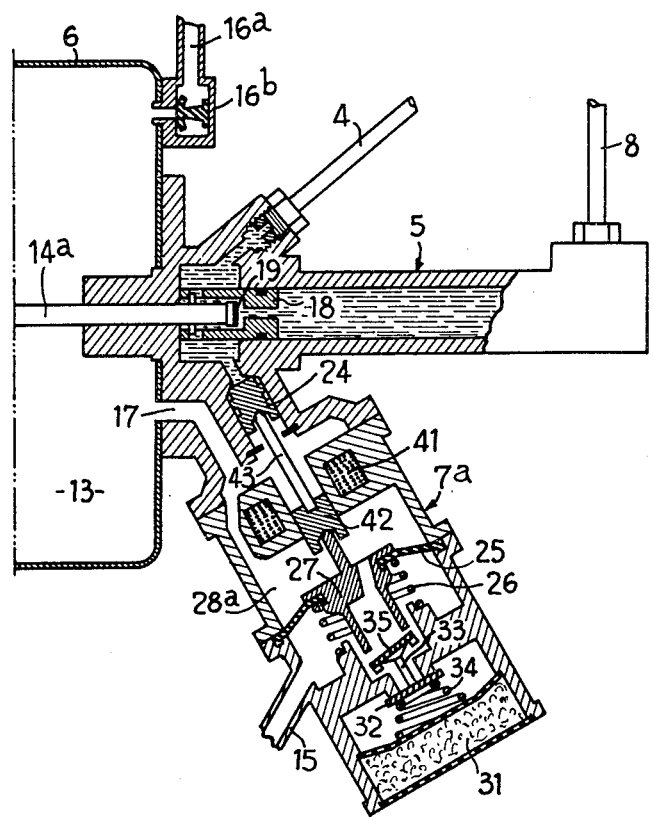

In the drawings:
FIG. 1 is a diagram of a brake installation of the "Hydrovac" type commercialised by the company Bendix improved in accordance with the invention;
FIG. 2 is a partial sectional view thereof on an enlarged scale, and
FIG. 3 is a similar view of a modification.

The invention will be described as applied to a brake installation of the "Hydrovac" type commercialised by the company Bendix. In order to clarify the description, the operation of this installation, as it is known, will be recalled.

In FIG. 1, the part in thin lines corresponds to the known installation and the part in heavy lines to the present invention.

Reference will be had first to the embodiment shown in FIGS. 1 and 2.

FIG. 1 shows an internal combustion engine M adapted to drive the driving wheels R of the vehicle. These wheels, and preferably the non-driving wheels, are provided with a brake receiver F.

The brakes are fed with oil from a tank 1 through a master cylinder 2 subjected to the action of a brake pedal 3 and connected to the input inlet of an emitting cylinder 5 through a conduit 4. The cylinder 5 is controlled by a pneumatic assisting servo-motor 6 controlled automatically by a valve 7. The emitting cylinder 5 is connected—through a conduit 8 having as many branch-connections as there are brake receiving cylinders to be fed thereby—to said cylinders, such as that shown at 9 in respect of the brake F.

The driving cylinder 6 contains a piston 10 carried by a diaphragm 11 defining two chambers 12, 13, a return spring 14 and a thrust rod 14ᵃ. In the "Hydrovac" system, a connection tube 15 directly connects, as shown by the dot-dash line 15 in FIG. 1, the left chamber 12 of the cylinder 6 to the lower part of the control valve 7. The right chamber 13 of the cylinder communicates with a source of vacuum, for example with the induction manifold 16 of the engine M, through a conduit 16ᵃ provided with a check valve 16ᵇ and, moreover, with the upper part of the control valve 7 through a passageway 17.

The controlled cylinder 5 contains a piston 18 provided with an axial aperture 18ᵃ and ports 18ᵇ in which is slidable the end of the thrust rod 14ᵃ which terminates in a valve element 19. This rod is connected to the piston 18 with axial play by a pin 20. A seal 21 renders the passage of the thrust rod 15 between the two cylinders 5 and 6 oiltight.

An aperture 22 puts the left part of the cylinder 5 in communication with a bore 23 of the control valve 7. Movable in this bore is a piston 24 connected to a diaphragm 25 which is biased by a spring 26 and carries a plunger 27 having a throughway aperture and normally putting an upper chamber 28, with which the passageway 17 communicates, in communication with an intermediate chamber 29 with which the conduit 15 communicates and which is capable of communicating with the atmosphere by way of an aperture 30 and an air filter 31. The aperture 30 is normally closed by the lower closing element 32 of a double valve 33 which is biased by a spring 34 and whose upper closing element 35 is co-operable with the lower end of the plunger 27.

It will be recalled that this known assembly operates in the following manner:

At rest, the daphragm 25 is biased by the spring 26 and this puts in vacuum communication the upper chamber 28 and the lower chamber 29 of the valve 7 and consequently the right chamber 13 and left chamber 12 of the driving cylinder 6 through the conduits 17 and 15 respectively.

The spring 14 maintains the piston 10 in the extreme left position and leaves the valve 19 open. This puts the two parts of the controlled cylinder 5 in communication with each other through the piston 18. The spring 34 maintains the double wall 33 in its upper position so that atmospheric air is prevented from entering the body of the valve 7.

In the braking position, the oil pressure from the master cylinder 2 is sent to the left chamber of the controlled cylinder 5, then through the piston 8 in the right chamber and thence to the brakes F.

Beyond any given pressure value, the piston 24 of the valve 7 is shifted downwardly by the action of this pressure. In a first stage, the plunger 27 constituting a centre seat carried by the diaphragm 25 comes in contact with the upper closing element 35 of the valve 12 and closes the communication between the two chambers 28 and 29 of the valve 7. In a second stage, the lower closing element 32 of the double valve is shifted away from its seat and allows atmospheric air into the lower chamber 29 of the valve and thence into the left chamber 12 of the driving cylinder 6 through the conduit 15.

Consequently, the piston 10 moves towards the right and first applies the valve 19 on its seat formed in the piston 18, and then shifts this piston which urges the oil in the direction of the brakes F.

The differential pressure of the air acting on the lower face of the diaphragm 25 creates a reaction force, directed upwardly, which opposes the downward movement of the piston 24. This reaction is balanced by the hydraulic pressure produced by the master cylinder 2 which is proportional to the effort exerted on the brake pedal 3 by the driver.

If the latter maintains his force on the pedal constant, the assembly is stabilised in a position of equilibrium. The two closing elements of the valve 33 are urged against their respective seats and the reaction balances the force exerted on the brake pedal 3.

Any increase in the force on this pedal shifts the lower closing element 32 from its seat and increases the air pressure exerted on the piston 10 and also the reaction on the pedal.

The total hydraulic pressure transmitted to the brakes F is the result of forces exerted by the hydraulic pressure of the master cylinder 2 on the piston 18 of the controlled cylinder 5 and by the differential pressure exerted on the driving piston 10.

The assembly is returned to its position of rest by releasing the brake pedal 3. The hydraulic pressure above the piston 24 is eliminated. Under the action of the spring 26 the diaphragm 25 is urged upwardly until the lower valve 32 is closed and the upper valve 35 opened. Communication between the two chambers 12 and 13 of the driving cylinder 6 is reestablished and the piston 10 returns to its position of rest, it shifting the piston 18 towards the left after the opening of the valve 19.

But the foregoing assembly could result in wheel lock. To avoid this, in accordance with the invention, and according to a first embodiment, a three-way electrovalve 35 is disposed between two sections of the conduit 15ᵃ and 15ᵇ which replace the single conduit 15 which connects the left chamber 12 of the cylinder 6 in the conventional "Hydrovac" system. This electrovalve puts the chamber 12 in communication either with the chamber 29 of the control valve 7 or through a pipe 36 with a source of vacuum, for example through the pipe 16ᵃ with the induction pipe 16 of the engine (FIG. 1).

The coil 37 of the electrovalve is connected to a source of electricity 38 (FIG. 1) through switches, such as 39, which are controlled by one or more wheel-lock detectors 40. In the event of wheel lock, the detector 40 of any one of the known types closes the switch 39.

The arrangement is such that when the electrovalve is carrying current, the wheel being locked, the chamber 12 of the driving cylinder 6 is under a vacuum through the conduits 15ᵇ and 36.

Now, in normal operation, the electrovalve 35 is not fed it is therefore in the illustrated position and does not modify the operation of the "Hydrovac" system as described hereinbefore.

On the other hand, in the event of wheel lock, the corresponding detector 39–40 feeds the electrovalve 35 and puts the left chamber 12 of the cylinder 6 with the vacuum supply through the additional conduit 36. In these conditions, the combined action of the spring 14 and the pressure prevailing in the right chamber of the controlled cylinder 5, shifts the two pistons 10 and 18 towards the left and produces a pressure drop in the brake cylinders 9 which is sufficient to unlock the locked wheel or wheels.

Once this unlocking has been achieved, the three-way electrovalve 35 resumes its initial position and a new braking will occur normally. Thus, it is possible to effect a succession of brake applications and releases with no intervention or modification of the hydraulic circuit.

In the modification shown in FIG. 3, an electromagnet 41 is disposed in the upper chamber 28ᵃ of the control valve 7ᵃ, this electromagnet, which is fed as in the first embodiment by the wheel lock detector, acting on an armature 42 connected to the rod 43 of the piston 24 of the valve.

Here again, in normal operation, the electromagnet 41 in no way modifies the function of the "Hydrovac" system as previously described.

On the other hand, in the event of the locking of one or more wheels, the detector feeds the coil of electromagnet 41 which shifts the armature 42 and the piston 24 upwardly thus closing the lower closing element 32 of the double valve 33 and opening the upper closing element 35. Communication between the two chambers of the cylinder 6 is then re-established and the preceding case is returned to.

Although specific embodiments of the invention have been described, many modifications and changes may be made therein.

Having now described my invention what I claim as new and desire to secure by Letters Patent is:

1. A hydraulic brake installation comprising in combination a master cylinder, a vacuum servo-motor assisting said master cylinder, an emitting cylinder controlled by said master cylinder and said vacuum servo-motor, said servo-motor comprising a cylinder and a piston defining two chambers in the servo-motor cylinder, one of said chambers being connected to a source of vacuum, a control valve comprising a body, a diaphragm defining two chambers in said body, one of said chambers of the control valve communicating with said one chamber of the servo-motor and the other of said chambers of the control valve communicating with said other chamber of the servo-motor, a plunger supported by said diaphragm and provided with a throughway aperture for connecting said two chambers in said body, a bore in said body adjacent said one chamber, a tappet or piston slidably mounted in said bore, subjected to the fluid pressure in said master cylinder and engaging said plunger, spring means for urging said plunger against the action of said tappet, an aperture in said body for connecting said other chamber with the atmosphere, a double valve member, spring means for urging said double valve member towards a position in which it closes said aperture, whereby when said tappet slides in said bore in one direction, said plunger engages said double valve member, thereby closing the throughway aperture in the plunger, venting said other chamber to the atmosphere and actuating the servo-motor, means being provided for moving said plunger against the action of said tappet when a wheel of the vehicle is locked.

2. A hydraulic brake installation as claimed in claim 1, wherein said means comprise an electromagnet having a coil incorporated in said body and an armature connected to said tappet, said coil being mounted in series with a power source and a wheel lock detector, whereby when said coil is energized, said tappet is moved against the action of said fluid pressure.

References Cited

UNITED STATES PATENTS 3,325,226   6/1967   Perrino _____ 303—21

MILTON BUCHLER, Primary Examiner
JOHN J. McLAUGHLIN, Jr., Assistant Examiner

U.S. Cl. X.R.

60—54.5; 303—6